United States Patent
Koch et al.

(10) Patent No.: US 7,151,147 B2
(45) Date of Patent: Dec. 19, 2006

(54) METHOD FOR PRODUCING POLYMERS USING CONJUGATED DIENES AND VINYL AROMATIC COMPOUNDS, POLYMERS PRODUCED ACCORDING TO SAID METHOD AND USE THEREOF

(75) Inventors: Herbert Koch, Raesfeld (DE); Wolfgang Adametz, Recklinghausen (DE)

(73) Assignee: Sasol Germany GmbH, Hamburg (DE)

( * ) Notice: Subject to any disclaimer, the term of this patent is extended or adjusted under 35 U.S.C. 154(b) by 0 days.

(21) Appl. No.: 10/523,180

(22) PCT Filed: Jul. 24, 2003

(86) PCT No.: PCT/DE03/02490

§ 371 (c)(1),
(2), (4) Date: Oct. 14, 2005

(87) PCT Pub. No.: WO2004/016666

PCT Pub. Date: Feb. 26, 2004

(65) Prior Publication Data

US 2006/0122343 A1 Jun. 8, 2006

(30) Foreign Application Priority Data

Jul. 30, 2002 (DE) ................. 102 34 746

(51) Int. Cl.
*C08F 4/56* (2006.01)
*C08F 236/10* (2006.01)
(52) U.S. Cl. .............. 526/174; 526/181; 526/340; 525/332.3; 525/332.9
(58) Field of Classification Search ............ 526/174, 526/181, 340, 332.3, 332.9
See application file for complete search history.

(56) References Cited

U.S. PATENT DOCUMENTS

| | | | | |
|---|---|---|---|---|
| 3,294,768 | A | * 12/1966 | Wofford | ............ 526/174 |
| 3,496,154 | A | 2/1970 | Wofford | |
| 4,577,002 | A | * 3/1986 | Broekhuis | ............ 526/181 |
| 5,008,343 | A | 4/1991 | Hellermann et al. | |
| 5,654,384 | A | 8/1997 | Halasa et al. | |
| 6,472,464 | B1 | 10/2002 | Morita et al. | |
| 2002/0022704 | A1 | 2/2002 | Giebeler et al. | |
| 2002/0107339 | A1 | 8/2002 | Knauf et al. | |
| 2004/0014915 | A1 | 1/2004 | Knoll et al. | |

FOREIGN PATENT DOCUMENTS

| | | |
|---|---|---|
| CA | 2316770 | 8/2000 |
| EP | 0483046 | 3/1996 |
| EP | 0798339 A2 | 1/1997 |
| EP | 0304589 | 7/1998 |
| WO | WO03044065 | 5/2003 |

OTHER PUBLICATIONS cf. Antkowiak, T.A. et al, J. of Polymer Science, Part A-1, vol. 10, pp. 1319-1334 (1972).
Houben-Weyl, Methods of Org. Chemistry, vol. 1411 (1961), p. 698.
Koch H. et al, Int. Fachzeitschrift f.d. Poylmer-Verarbeitung, Bd. 55, Nr. 3, 2000, p. 162-166 English Language Abstract.

* cited by examiner

*Primary Examiner*—Fred Teskin
(74) *Attorney, Agent, or Firm*—C. James Bushman; Browning Bushman P.C.

(57) ABSTRACT

This invention relates to a process for producing polymerisates by anionic polymerization in an inert reaction medium using conjugated dienes and vinylaromatic compounds in the presence of a catalyst, co-catalyst, and randomizer. Further, the invention relates to the polymerisates produced thereby and their uses.

18 Claims, No Drawings

METHOD FOR PRODUCING POLYMERS USING CONJUGATED DIENES AND VINYL AROMATIC COMPOUNDS, POLYMERS PRODUCED ACCORDING TO SAID METHOD AND USE THEREOF

The present invention relates to a process for producing polymerisates using conjugated dienes and vinylaromatic compounds by anionic polymerization in the presence of a catalyst, co-catalyst, and randomizer. Further, this invention relates to the polymerisates produced thereby and their uses.

Tyres are among the most stressed parts of an automobile. In view of a barely postcard-sized wheel tread per tyre, the tyres need to fulfill ever higher requirements with regard to transforming the enhanced motor power into motion, ensuring road grip at high speed in bends, and making sure a short stopping distance on wet roads.

Automobile tyres need to fulfill the tightened requirements on safety, environmental protection, and economics, which is especially difficult due to the often incongruous demands. For instance, reduced rolling resistance helps to lower the fuel consumption, but the wet-road grip is usually sacrificed, thus deteriorating the safety as well. The development of tyres having nearly perfect properties is a complex task for tyre manufacturers confronted with the conflicting demands on the rolling, abrasion, and wet-skid resistance of a tyre.

The successful development of tyres having low rolling resistance combined with nearly unchanged wet-skid and abrasion resistance is currently dependent on the optimal interplay of novel solution SBR (SBR=styrene-butadiene rubber) used conjointly with silicic acid as a filler. The result is a significant reduction in rolling resistance combined with improved wet-road grip and largely unchanged abrasion features. The fuel consumption can thus be reduced by as much as five percent.

Based on these findings and the development of marketable solution SBR, the market volume of solution SBR has increased in comparison with conventional emulsion SBR. This trend is very likely to continue, mostly because the solution process allows greater flexibility than the emulsion process with regard to microstructure variations of the rubber molecules.

In emulsion polymerization the microstructure of the tyre polymer is very difficult to control. For example, the glass temperature (Tg) of the rubber molecules, which is most essential in tyre technology, can only be controlled by the styrene content in the polymer molecule.

In contrast thereto, the conditions of solution SBR with lithium catalyst initiation are much more favorable. The molecular masses are largely variable and by addition of divinyl benzene (DVB) for example it is even possible to shift the strictly linear structure of the molecules having a narrow molecular mass distribution toward a characteristic resembling that of emulsion SBR. Further, the glass temperature can be varied both by the incorporated styrene quantity and by influencing the incorporation of diene monomers, thereby changing the vinyl content in the polymer.

Since in anionic polymerization the microstructure can efficiently be controlled by addition of polar substances termed microstructure modifiers or co-catalysts, plenty of new rubber molecules are accessible.

By polarisation of conjugated dienes various reaction centres are available for incorporation of the diene into the polymer. As to butadiene, incorporation into both 1,4-structural units and 1,2-structural units is possible. Isoprene further offers the alternative of 3,4-structural units. Chain growth by incorporation of 1,4-structural units leads to linear polymers, while the addition of 1,2- or 3,4-structural units produces vinyl- or isopropenyl substituents along the polymerization chain.

When no microstructure modifier is added, polymers having mostly cis-1,4- and trans-1,4-microstructures and remarkably reduced glass temperatures are formed by incorporation of conjugated diene monomers. When butadiene is polymerised with butyllithium in the presence of an appropriate microstructure modifier, which usually acts as a Lewis base, the vinyl group content increases to greater than the typical value of 10%. The vinyl content is in the range from 10% to >80%, depending on the type and quantity of the Lewis base. Since the controlling effects of the microstructure modifiers depend very much on the polymerization temperature, completely different solution polymerisates may be produced by controlling the temperature.

In the past, numerous processes for producing polymerisates based on conjugated dienes have been developed, wherein different polar substances, which are often termed co-catalysts, are employed as microstructure modifiers.

A suitable microstructure modifier basically needs to fulfill lots of requirements with different priorities, depending on the specific conditions in the individual polymerization facility, e.g.

- a good controlling effect even at high temperatures and the lowest possible concentration
- increased polymerization rate
- complete conversion of monomers
- good stability, i.e. no termination of living chain ends, especially also at higher temperatures
- sufficient randomization, i.e. statistical incorporation of different monomers or differently incorporated monomeric units
- complete separability of the microstructure modifier from the polymerization solvent.

A large quantity of co-catalyst combined with an insufficient microstructure controlling effect has a direct impact on the economics of a production process. It is therefore advisable to achieve the desirable effect with a molar ratio of the co-catalyst to the catalyst of less than 10:1.

In order to improve the processing properties of solvent rubbers for tyre manufacturers, it is customary to use branched rubbers. A particularly preferred variant of the polymerization techniques is the transformation of living polymer ends into star-shaped polymers, once the polymerization is terminated, by means of a coupling agent, such as divinyl benzene or $SiCl_4$ to effect the formation of star-shaped block copolymers. The microstructure modifier therefore needs to be largely inert to the 'living chain end' at high temperatures in order not to terminate these ends.

Hydrocarbons, such as hexane or cyclohexane, are usually employed as a solvent in the commercial production of solution SBR. In order that the solvent can be re-cycled, which is important for an economic production, it is necessary that the co-catalyst be completely separable from the solvent.

A large number of microstructure modifiers, which can be divided into two main groups, are known in the art, namely
  a) aminic compounds and
  b) ether group-containing compounds.

Common aminic compounds include trimethylamine, triethylamine, N,N,N',N'-tetramethylethylenediamine, N-methylmorpholine, N-ethylmorpholine, and N-phenylmorpholine.

Typical ether group-containing Lewis bases include diethylether, di-n-propylether, diisopropylether, di-n-butylether, tetrahydrofuran, dioxanes, ethyleneglycol di-methylether, ethyleneglycol diethylether, diethyleneglycol dimethylether, diethyleneglycol dimethylether, triethyleneglycol dimethylether etc.

Aminic compounds often have an unfavorable impact on the steel adhesion in tyres. Furthermore, they usually give off an unpleasant odour.

Aliphatic dialkylethers, e.g. diethylether, and cyclic ethers, e.g. tetrahydrofuran (THF), usually have an unsatisfactory controlling effect on the microstructure (cf. Antkowiak, T. A. et al, *J. of Polymer Science*, Part A-1, vol. 10, pp. 1319–1334 (1972)). By anionic polymerization of butadiene with butyllithium in the presence of THF in as much as 85-fold excess the resultant polybutadiene has not more than 49 mol % of a 1,2-structural unit. The use of this large amount of co-catalyst is economically unacceptable.

In contrast thereto, ethyleneglycol dimethylether has a significantly enhanced controlling effect combined with the advantage of requiring only a low concentration. However, this microstructure modifier has other disadvantages, e.g. it cannot satisfactorily be separated from hexane and the coupling yield is nil. It is assumed that the two other prior-art compounds of this group, i.e. ethyleneglycol diethylether and ethyleneglycol dibutylether, do not fulfill the above-mentioned requirements either.

A class of microstructure modifiers, which up to now has come closest to the aforesaid requirements, has been described in EP 0304589-B1, which relates to a process for preparing solution SBR and solution ISBR (isoprene-styrene-butadiene rubber) using asymmetrical dialkyl ethers as co-catalysts, e.g. ethyl-ethyleneglycol-tert-butylether.

Nevertheless, this microstructure modifier, too, has a disadvantage, especially with regard to recent developments in the field of tyre rubbers, particularly in the segment comprising high-performance tyres, where solution SBR types having a high styrene content are employed. Typical solution SBR types have a styrene content of approx. 25 wt. % in the polymer, whereas the 'high-styrene types' have a content from 30 to 60 wt. %. When increasing the styrene content with the glass transition temperature $T_g$ remaining constant, the rubber-elastic properties are considerably influenced. Solution SBR types with a higher styrene content have advantages when used in tyres, especially with regard to handling, cornering ability, and road grip.

When producing high-styrene rubbers, the randomizing effect of the modifier is an important criterion for the quality, including the prevention of block formation, especially styrene blocks.

In a continuous copolymerization of butadiene/styrene the microstructure modifiers described in EP 0304589-B1 are suitable to enable random incorporation of styrene in quantities of up to approx. 15 to 20 wt. % without block formation. At higher styrene concentrations the randomising effect can be further increased by addition of surfactants, as described in the aforesaid patent. However, a styrene content in the range from 30 to 60 wt. % for example may require a large amount of surfactant, which has an adverse effect on the overall characteristics of a rubber. Moreover, an additional co-catalyst, hereinafter termed 'randomizer', needs to be separately added, which may cause problems in the production facility.

Another possibility of achieving a satisfactory randomizing effect with a high styrene content may be enabled by a special manufacturing procedure plus a micro-structure modifier, wherein an additional amount of the more reactive component, e.g. butadiene in styrene-butadiene copolymers, is added later. However, such a procedure will make the production more complex and mostly results in longer residence times, thus impairing the process economics.

It is the object of the present invention to provide a process, which does not have the abovementioned disadvantages and that is capable of ensuring the production of rubbers containing a large amount of styrene and a vinyl modifier plus sufficient randomization of the monomers.

According to the present invention, the problem has surprisingly been resolved by providing a process, which favorably fulfills the requirements mentioned herein-above. The process of the invention is characterized by converting by anionic polymerization in an inert reaction medium conjugated dienes and vinylaromatic compounds in the presence of at least one lithium-organic compound (catalyst), at least one dialkyl ether (co-catalyst) of the formula

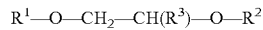

wherein $R^1$ and $R^2$ are independently of one another alkyl residues having a different number of carbon atoms, which are selected from the group comprising methyl-, ethyl-, n-, and iso-propyl, and n-, iso-, sec-, and tert-butyl, and wherein the total carbon atoms in the two alkyl residues $R^1$ and $R^2$ are 5 to 7, preferably 5 or 6, and $R^3$ represents hydrogen or a methyl- or an ethyl group, and at least one alkali-organic compound (randomizer), preferably an alkali metal alcoholate, wherein one alcoholate group has a saturated hydrocarbon radical having 1 to 10 carbon atoms and the alkali-organic compound is employed at a molar ratio of >0.5 mol:1 mol of lithium in the lithium-organic compound, preferably >0.55:1 mol.

The resultant products are primarily block-free polymerisates, which are optionally coupled. The preferred embodiments of the subject invention are set out hereinafter or in the subordinate claims.

The catalyst system is distinguished by the fact that the alkali metal alcoholates are employed conjointly with the lithium catalyst and the ethyleneglycol dialkylether.

Organolithium compounds are used as catalysts, which preferably have the structure R-Li, wherein R represents a hydrocarbon radical with 1 to 20 carbon atoms.

In general, monofunctional organolithium compounds having 1 to 12 or 1 to 10 carbon atoms are employed. Typical examples include methyllithium, ethyllithium, isopropyllithium, n-butyllithium, sec-butyllithium, n-octyllithium, tert-octyllithium, n-decyllithium. Preferably, n-butyllithium or sec-butyllithium is used. The lithium catalyst content varies with the type and molecular mass of the rubber to be produced. As a general rule, the molecular mass of the polymer is reversibly proportional to the amount of catalyst employed. In principle, 0.01 to 1 part by weight per 100 parts of lithium catalyst monomer are used.

Preferably, 0.128 to 0.016 part by weight of n-butyllithium is required for a desirable molecular mass in the range from 50,000 to 400,000 g/mol, based on 100 parts by weight of monomers.

The co-catalysts employed in the process of the invention have the following structure:

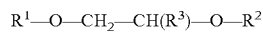

wherein $R^1$ and $R^2$ are alkyl residues with a different number of carbon atoms, which are selected from among the group comprising methyl-, ethyl-, n- and iso-propyl, n-, iso-, sec- and tert-butyl, and wherein the total carbon atoms in the two alkyl residues $R^1$ and $R^2$ are 5 to 7, preferably 5 or 6, and $R^3$ represents hydrogen or a methyl- or ethyl group, preferably hydrogen.

Preferable co-catalysts of this group are compounds, wherein $R^1$ represents methyl or ethyl and $R^2$ is tert-butyl. The ethers preferably employed in the process of the invention are produced by reaction of the corresponding alcohols with isobutene in the presence of an acidic ion-exchange resin.

The co-catalyst is employed at a ratio from 2:1 to 30:1, preferably 2:1 to 15:1, based on the number of molecules of the catalyst (referring to lithium atoms). The feed quantity is basically dependent on the temperature as well, i.e. higher temperatures generally require larger feed quantities in order to achieve the desirable microstructure controlling effect. The co-catalyst acts as a microstructure modifier, which may also influence the copolymerization parameters and/or the random incorporation of a co- or terpolymer. As to the co-catalyst, reference is made to EP 0304589-B1 and U.S. Pat. No. 5,008,343-A, which thus are explicitly incorporated herein.

It is preferable that the alkali-organic compounds be alkali metal alcoholates of the structure M-OR, wherein R represents a linear or branched alkyl group having 1 to 10 carbon atoms. Preferably, M represents sodium or potassium, most preferably sodium. Sodium alcoholates comprising 3 to 8 carbon atoms are particularly preferred. Typical examples are sodium-tert-butylate and sodium-tert-amylate.

Satisfactory randomization is achieved at a molar ratio of the alkali metal alcoholate to the lithium from >0.5:1 in the lithium-organic compound, preferably >0.55:1. The process of the invention is preferably characterized by the fact that the alkali-organic compound is employed in quantities from >0.5 to 3 mol per 1 mol of lithium-organic compound, based on the molar amount of lithium atoms in the lithium-organic compound, preferably from 0.55:1 to 2:1 mol.

In particular, the conversion of the monomers can be accelerated by using a molar ratio of the alkali metal alcoholate to the co-catalyst in the feed from 0.01:1 to 10:1, preferably 0.01:1 to 0.5:1.

The use of alkali metal alcoholates for preparing homopolybutadiene has for example been disclosed in U.S. Pat. No. 5,654,384. Reportedly, high-vinyl homobutadiene polymers can be obtained by said method. The co-catalysts employed according to the aforesaid patent are different from those mentioned hereinabove and it has been found that alkali metal alcoholates increase the amount of 1,2-incorporated butadiene. No randomising effect has been described. It has therefore been all the more surprising that by combining the co-catalysts employed in the process of the invention with alkali metal alcoholates the randomising effect in the production of co- and terpolymers can be significantly increased.

Examples of the preferred monomers employed include styrene with isoprene, styrene with 1,3-butadiene or styrene with 1,3-butadiene and isoprene. Further appropriate monomers are 1,3-pentadiene, 1,3-hexadiene, 3-dimethyl-1,3-butadiene, 2-ethylbutadiene, 2-methyl-1,3-pentadiene and/or 4-butyl-1,3-pentadiene.

The term 'vinylaromatic compound' employed herein means a compound having one or more vinly group(s) (—CH═CH$_2$) on the aromatic ring and preferably 8 to 20 carbon atoms. Vinylaromatic compounds which are particularly suitable for the copolymerization with conjugated dienes include styrene, 1-vinylnaphthalene, 2-vinylnaphthalene, 3-methylstyrene, 4-methylstyrene, 4-propylstyrene, 4-cyclohexylstyrene, 4-dodecylstyrene, 2-ethyl-4-benzylstyrene and/or 4-(phenylbutyl)-styrene.

Butadiene, isoprene, styrene with isoprene, styrene with butadiene or styrene with butadiene and isoprene are preferably employed as monomers. It is preferable that more than 90 mol % of all monomers incorporated into the polymerisate are 1,3-butadiene, isoprene and/or styrene. It is further preferable that the polymerisate contains 30 to 60 wt. % styrene-/vinylaromatic monomers.

Suitable couplers may be used as cross-linking agents prior to or during the polymerization reaction. Aromatics bearing several vinylic groups are particularly suitable to this end. Representative examples are for example di(vinyl/isopropenyl)benzene and tri(vinyl/isopropenyl)benzene, particularly 1,3,5-trivinylbenzene and 1,3- and 1,4-divinylbenzene. Said monomers bring about long-chain branching of the individual polymer chains.

A particularly preferred variant of the process of the invention is the coupling of the polymerised units (termed 'living polymer chains') obtained after essentially complete conversion of the monomers to form star-shaped polymers using a coupler. Particularly suitable couplers are tetrahalides of the elements silicon, germanium, tin and lead and aromatics bearing at least two vinyl groups, such as 1,3,5-trivinylbenzene and 1,3- and 1,4-divinylbenzene.

The reaction medium is an inert organic solvent/diluent. In principle, hydrocarbons with 5 to 15 carbon atoms, such as pentane, hexane, heptane, and octane and their cyclic analogues and the blends thereof are appropriate. Moreover, aromatic solvents, such as benzene, toluene etc. may be employed as well. Saturated, aliphatic solvents, e.g. cyclohexane and hexane, are preferred.

The process of the invention can be performed in different ways. For example, the co-catalyst and the alkali metal alcoholate can be separately added. Generally, these substances are added prior to the actual polymerization. It is advisable to add the alcoholate as a solute and, preferably, the alcoholate is blended with an inert solvent, e.g. hexane, as a reaction medium.

According to another preferred embodiment, the alcoholate is used as a blend with the co-catalysts employed in the process of the invention. In particular, the preferred alkali metal alcoholates, i.e. sodium-tert-butylate and/or sodium-tert-amylate, are sufficiently soluble in the corresponding co-catalysts to enable the introduction of the desired amount of alcoholate in the polymerization process. The rubber manufacturers are thus able to employ a balanced ready-for-use compound consisting of co-catalyst and randomizer in the desired quantity, thus facilitating the polymerization process.

In the discontinuous production of rubbers according to the process of the invention it is advisable to first charge all substances, i.e. co-catalyst (ether compound), solvent, monomers and, optionally, cross-linking agent, to titrate in the second step with a lithium-organic compound and, finally, to add the amount of catalyst required for polymerization. The lithium-organic titer acts as a scavenger eliminating impurities, particularly those containing active hydrogen atoms.

The monomeric structural units are polymerised at 0 to 130° C., preferably 20 to 100° C. The polymerization can be performed as a discontinuous or continuous process. The coupling, too, is carried out in the preferred temperature range from 20 to 100° C.

The polymerisates of the invention are preferably employed in tyres, especially tyre treads, which are produced by established vulcanization methods. The tyres produced in this way are distinguished by excellent high-speed, wet-grip, and snow-grip characteristics. Hence, they are suitable as mud and snow (M+S) tyres or winter tyres.

EXAMPLES

A hydrocarbons blend containing about 50% n-hexane (also known as C6 cut) was used as a solvent. Said blend also contained pentane, heptane, octane, and their isomers. The solvent was dried over a molecular sieve having a pore width of 0.4 nm. The water content was thus reduced to less than 10 ppm, followed by stripping with $N_2$.

N-Butyllithium (BuLi) was employed as an organic lithium compound (15 wt. % solution in hexane). The styrene monomer was separated from the stabiliser by distillation, followed by titration with n-butyllithium in the presence of o-phenanthrolin. The microstructure modifier was titrated in the same way.

Prior to use, the sodium alcoholates were dissolved in the microstructure modifier. Divinylbenzene (DVB) was employed as a blend of m- and p-divinylbenzene as a 64% solution in hexane.

The turnover was determined by measuring the solids content after vaporization of solvent and monomers. The microstructure was determined by IR spectroscopy. The block-styrene content was determined by Houben-Weyl, Methods of Org. Chemistry, Vol. 14/1 (1961), p. 698. Parts shall mean parts by weight.

Into a stainless-steel autoclave purged with dry nitrogen, there were placed 400 parts of hexane and a monomers blend of 50 to 80 parts of 1,3-butadiene and 50 to 20 parts of styrene, followed by drying over molecular sieves (0.4 nm). Then, 0.02 parts of DVB and the microstructure modifier or the microstructure modifier plus sodium alcoholates were added (for the quantities, see Table 1, following). The product was titrated with butyllithium with thermoelectrical monitoring. Polymerization was initiated at 50° C. by adding the amount of n-butyllithium (as parts by mass) stated herein. The temperature increased for a short while to max. 72° C. despite cooling. The turnover was determined by measuring the solids content. The batch was completely polymerised. After cooling to 40° C., the polymerization was stopped by adding a solution of 0.5 part of 2,2'-methylene-bis(4-methyl-6-tert-butylphenol) in 2 parts of moist toluene. The solvent was removed by steam distillation and the polymerisate was dried for 24 hours at 70° C. in an air circulating drying cabinet.

TABLE 1

| | Example | | | | | | | | | |
|---|---|---|---|---|---|---|---|---|---|---|
| | 1* | 2* | 3* | 4* | 5 | 6 | 7 | 8 | 9 | 10 |
| Premix (parts[6]): | | | | | | | | | | |
| Texane | 400 | 400 | 300 | 400 | 300 | 400 | 400 | 400 | 300 | 400 |
| Butadiene | 60 | 50 | 60 | 40 | 60 | 66.6 | 50 | 66.6 | 70 | 40 |
| Isoprene | | | | 20 | | | | | | 20 |
| Styrene | 40 | 50 | 40 | 40 | 40 | 33.3 | 50 | 33.3 | 30 | 40 |
| TMEDA [1] | 0.75 | 0.75 | | | | | | | | |
| BEE [2] | | | 0.55 | 0.75 | 0.75 | 0.75 | 0.75 | 1.0 | 0.75 | 0.75 |
| Sodium-tert-butylate | | | | | 0.05 | 0.04 | | | 0.05 | 0.05 |
| Sodium-tert-amylate | | | | | | | 0.04 | 0.05 | | |
| DVB | 0.02 | 0.02 | 0.02 | 0.02 | 0.02 | 0.02 | 0.02 | 0.02 | 0.02 | 0.02 |
| Start: | | | | | | | | | | |
| LiBu (parts) | 0.05 | 0.05 | 0.04 | 0.04 | 0.035 | 0.04 | 0.04 | 0.05 | 0.05 | 0.04 |
| Start temperature (° C.) | 50 | 50 | 30 | 50 | 30 | 50 | 50 | 50 | 30 | 50 |
| End temperature (° C.) | 54 | 58 | 95 | 59 | 120 | 59 | 72 | 74 | 123 | 62 |
| Run time (minutes) | 120 | 180 | 23 | 120 | 4 | 60 | 60 | 60 | 4 | 90 |
| Microstructure (wt. %): | | | | | | | | | | |
| trans-1,4-butadiene | 18 | 17 | 11 | 7 | 12 | 10 | 6 | 10 | 13 | 5 |
| trans-1,2-butadiene | 35 | 26 | 44 | 27 | 42 | 51 | 38 | 51 | 46 | 29 |
| cis-1,4-butadiene | 8 | 8 | 5 | 7 | 7 | 7 | 5 | 7 | 10 | 8 |
| 3,4-isoprene | | | | 13 | | | | | | 13 |
| 1,4-isoprene | | | | 5 | | | | | | 5 |
| 1,2-isoprene [3] | | | | | | | | | | |
| Styrene | 39 | 49 | 31 | 41 | 39 | 32 | 51 | 32 | 31 | 40 |
| Block PS [4] | 0.3 | 0.35 | 9 | 1.5 | 0.35 | 0.2 | 0.4 | 0.1 | 0.3 | 0.3 |
| ML(1 + 4) (100° C.) [5] | | | 108 | | 119 | | | | 40 | |

Legend:
*comparative run
[1] N,N,N',N'-tetramethylethylenediamine
[2] ethylglycol-tert-butylether
[3] included in the 1,2-butadiene value
[4] determination of the block styrene according to Houben-Weyl, Method of Org. Chemistry, Vol. 14/1 (1961), page 698
[5] Mooney viscosity according to DIN 53523
[6] parts by weight

The invention claimed is:

1. A process for producing polymerisates by the use of conjugated dienes and vinylaromatic compounds by anionic polymerization in an inert reaction medium in the presence of
at least one lithium-organic compound,
at least one dialkyl ether of the formula $$R^1\text{—O—CH}_2\text{—CH}(R^3)\text{—O—}R^2$$

wherein
$R^1$ and $R^2$ are independently of one another alkyl residues having a different number of carbon atoms, which are selected from the group of methyl-, ethyl-, n-, and iso-propyl, and n-, iso-, sec-, and tert-butyl, and wherein the total carbon atoms in the two alkyl residues $R^1$ and $R^2$ are 5 to 7, and
$R^3$ represents hydrogen, a methyl- or an ethyl group, and
at least one alkali-organic compound, wherein the alkali-organic compound is employed in quantities from greater 0.5 mol per mol of lithium in the lithium-organic compound and
the alkali-organic compound is an alkali metal alcoholate of the formula M-OR, wherein R represents an alkyl group having 1 to 10 carbon atoms and M is sodium.

2. A process according to claim 1, characterised in that prior to or during the polymerization reaction, aromatics having several vinyl groups or alkyl aromatics having several vinyl groups are added as cross-linking couplers.

3. A process according to any one of the preceding claims 1 or 2, characterised in that at the end of polymerization the living chain ends are reacted with couplers, which are selected from the group of aromatics having several vinyl groups, alkyl aromatics having several vinyl groups, silicon tetrachloride, and tin tetrachloride.

4. A process according to any one of the preceding claims 1 or 2, characterised in that R represents an alkyl group having 3 to 5 carbon atoms.

5. A process according to any one of the preceding claims 1 or 2, characterised in that the alkali-organic compound is added to the polymerization mixture conjointly with the lithium-organic compound or the dialkylether in the form of a ready-for-use blend.

6. A process according to any one of the preceding claims 1 or 2, characterised in that the conjugated diene is 1,3-butadiene or 1,3-butadiene and isoprene.

7. A process according to any one of the preceding claims 1 or 2, characterised in that the inert reaction medium comprises cyclo-hexane and/or hexane.

8. A process according to any one of the preceding claims 1 or 2, characterised in that ethyl-ethyleneglycol-tert-butylether $(CH_3CH_2OCH_2CH_2OC(CH_3)_3)$ is employed as a dialkylether.

9. A process according to any one of the preceding claims 1 or 2, characterised in that a monolithium compound having 1 to 12 carbon atoms is used as a lithium-organic compound.

10. A process according to any one of the preceding claims 1 or 2, characterised in that the polymerization is carried out at 0 to 130° C.

11. A process according to any one of the preceding claims 1 or 2, characterised in that vinylaromatic compounds having one or more vinyl group(s) (—CH=CH$_2$) on the aromatic ring, preferably 8 to 20 carbon atoms, such that 30 to 60 wt. % of the monomeric units in the polymerisate are vinylaromatic compounds.

12. A process according to any one of the preceding claims 1 or 2, characterised in that the lithium-organic compound is used in quantities from 0.01 to 1 parts per 100 parts by weight of monomer.

13. A process according to any one of the preceding claims 1 or 2, characterised in that the dialkylether is employed at a molecular ratio from 2:1 to 30:1, based on the number of molecules of the catalyst (referring to the lithium atoms).

14. A process according to claim 1 wherein the vinyl aromatic compounds are styrene.

15. A process according to any one of claims 1 or 2, characterised in that a monolithium compound having 4 to 6 carbon atoms is used as a lithium-organic compound.

16. A process according to any one of claims 1 or 2, characterised in that the polymerization is carried out at 20 to 100° C.

17. A process according to any one of claims 1 or 2, characterised in that the lithium-organic compound is used in quantities from 0.01 to 0.2 parts per 100 parts by weight of monomer.

18. A process according to any one of claims 1 or 2, characterised in that the dialkylether is employed at a molecular ratio from 2:1 to 15:1, based on the number of molecules of the catalyst (referring to the lithium atoms).

* * * * *